US010283751B2

(12) United States Patent
Ichikawa et al.

(10) Patent No.: US 10,283,751 B2
(45) Date of Patent: May 7, 2019

(54) BATTERY WIRING MODULE AND BATTERY WIRING MODULE MANUFACTURING METHOD

(71) Applicant: Yazaki Corporation, Minato-ku, Tokyo (JP)

(72) Inventors: Yoshiaki Ichikawa, Kakegawa (JP); Hirotaka Mukasa, Kakegawa (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 672 days.

(21) Appl. No.: 14/967,793

(22) Filed: Dec. 14, 2015

(65) Prior Publication Data

US 2016/0172651 A1    Jun. 16, 2016

(30) Foreign Application Priority Data

Dec. 15, 2014  (JP) ................. 2014-253435

(51) Int. Cl.
*H01M 2/20*  (2006.01)
*H01M 2/10*  (2006.01)
*H01M 10/42*  (2006.01)
*H01M 10/48*  (2006.01)

(52) U.S. Cl.
CPC ......... *H01M 2/206* (2013.01); *H01M 2/1077* (2013.01); *H01M 10/425* (2013.01); *H01M 10/482* (2013.01); *H01M 2220/20* (2013.01)

(58) Field of Classification Search
CPC .................................................. H01M 2/206
See application file for complete search history.

(56) References Cited

U.S. PATENT DOCUMENTS 8,304,655 B2 * 11/2012 Ikeda .................. H01R 31/085
174/133 B

FOREIGN PATENT DOCUMENTS

| JP | 2010-114025 A | 5/2010 |
| JP | 2010114025 | * 5/2010 |
| JP | 2010190678 | * 10/2012 |
| JP | 2012190678 A | 10/2012 |

OTHER PUBLICATIONS

Office Action dated Jan. 4, 2017, by the Japanese Patent Office in counterpart Japanese Application No. 2014-253435.

* cited by examiner

*Primary Examiner* — Ula C Ruddock
*Assistant Examiner* — Thomas H. Parsons
(74) *Attorney, Agent, or Firm* — Sughrue Mion, PLLC (57) ABSTRACT

A battery wiring module is to be combined with a battery module including a plurality of battery cells stacked in a state of being alternatively reversed so that a positive electrode terminal and a negative electrode terminal are adjoined between the adjacent battery cells. The battery wiring module is provided with a plurality of linear conductors which are arranged in parallel at an interval, a plurality of bus bars which are arranged at a predetermined interval along to at least one side of the plurality of linear conductors, and an insulation resin part which integrally covers both an outer periphery of the plurality of linear conductors and side edges of the plurality of bus bars adjacent to the linear conductors.

6 Claims, 10 Drawing Sheets

BATTERY WIRING MODULE AND BATTERY WIRING MODULE MANUFACTURING METHOD

CROSS REFERENCE TO RELATED APPLICATIONS

This application claims priority from Japanese Patent Application No. 2014-253435 filed on Dec. 15, 2014, the entire contents of which are incorporated herein by reference.

BACKGROUND OF THE INVENTION

Field of the Invention

The present invention relates to a manufacturing method for a battery wiring module.

Related Art

In an in-vehicle battery pack to be connected to a power converter for driving a motor in a vehicle such as a hybrid car or an electric car, a battery module is configured that many battery cells are laminated in a manner of being alternatively reversed so that a positive electrode terminal and a negative electrode terminal are adjoined between the adjacent battery cells. Then, the electrode terminals of the adjacent battery cells are connected by a connection member such as a bus bar or the like, and thus a plurality of the battery cells are connected in series or in parallel.

In a case of assembling the battery module of the aforesaid configuration, it is necessary to connect between the electrode terminals via the respective connection members at plural portions. In view of this, a bus bar module is employed. The bus bar module is formed in a manner that a plurality of the connection members, arranged within a die according to the number of spaces among the electrode terminals to be connected, are integrally molded within insulation resin using an insert molding or the like.

In a case of connecting a plurality of the battery cells in series or in parallel, if battery characteristic such as a battery voltage is not uniform among the battery cells, degradation or breakage of the battery may be caused. Thus, in the in-vehicle battery pack, in order to stop charging or discharging before an abnormality occurs in a voltage between the respective battery cells, each of the bus bars is provided with a voltage detection wire for detecting a voltage of the corresponding battery cell.

In a bus bar module of a related art, the voltage detection wire adopts a configuration that a tip of a covered wire is peeled to expose a core wire, then a round terminal is crimped to the core wire, then the round terminal is fitted to an electrode terminal of a battery cell, and the round terminal is jointly fastened to the electrode terminal together with the connection member by a nut.

However, such the bus bar module has a problem that if the number of the voltage detection wires is large, an entire thickness of these wires becomes large and hence these wires are less likely bent. Also, as these wires are heavy as a whole, a wiring work of these wires becomes difficult. Further, the bus bar serving as the connection member is fitted to the positive and negative electrode terminals protruded from the battery cell. Also the round terminal crimped to the voltage detection wire is fitted to the electrode terminal and is jointly fastened to the electrode terminal together with the connection member by a nut. Thus, there arises a problem that a resistance value of a contact face between the bus bar and the round terminal becomes large to thereby cause a voltage drop therebetween.

In view of this, there has been proposed a high-voltage detection module device (bus bar module) for a battery pack which can easily wire to respective battery cells with a simple structure, and cause no voltage drop (for example, see a patent literature 1).

In this high-voltage detectionmodule device for the battery pack, a plurality of bus bars are arranged at an insulation frame body combined with a battery pack body in a state of connecting prescribed positive and negative electrode terminals of the battery cell, then a flat cable is disposed in a region of the insulation frame body except this arrangement region, and conductive wires, separated by making notches in a specified shape between the respective conductive wires of this flat cable while leaving roots, are welded to the predetermined bus bars, respectively.

As the high-voltage detection module device for the battery pack thus configured is constituted of the insulation frame body, the plurality of bus bars and the flat cable, this device can be configured by a simple structure. Further, the high-voltage detection module device can be configured by simple works of arranging the bus bars at the insulation frame body, separating the respective conductive wires from the flat cable, and welding the conductive wires to the respective bus bars.

PRIOR ART LITERATURE

Patent Literature

[Patent Literature 1] JP-A-2010-114025

However, the insulation frame body of the high-voltage detection module device of the patent literature 1 has a rectangular plate shape in a plan view, and is configured to have a plurality of protrusions arranged on a lower surface thereof with a predetermined space, and a plurality of through holes opened at a predetermined interval at the plate-shaped part. That is, each of the predetermined space and the number of the plurality of protrusions to be fitted into gaps among the respective battery cells is required to be changed depending on a size of the battery cell. Further, each of the predetermined interval and the number of the plurality of through holes opened at the same interval as that between the positive and negative electrode terminals of the battery cell is required to be changed depending on the size of the battery cell. Thus, the insulation frame body is a dedicated component for every kinds of the battery pack. As a result, this high-voltage detection module device has a low versatility and hence reduction of a manufacturing cost thereof is difficult.

SUMMARY OF THE INVENTION

One or more embodiments of the invention provide a manufacturing method for a battery wiring module which can easily perform wiring to respective battery cells with simple configuration, and also can improve versatility and reduce a manufacturing cost.

In an aspect (1), one or more embodiments provide a battery wiring module to be combined with a battery module including a plurality of battery cells stacked in a state of being alternatively reversed so that a positive electrode terminal and a negative electrode terminal are adjoined between the adjacent battery cells. The battery wiring module is comprising:

a plurality of linear conductors which are arranged in parallel at a predetermined interval;

a plurality of bus bars which are arranged in parallel at a predetermined interval along to at least one side of the plurality of linear conductors so that each of the plurality of bus bars electrically connects the positive electrode terminal and the negative electrode terminal adjacent to each other; and an insulation resin part which integrally covers both an outer periphery of the plurality of linear conductors and side edges of the plurality of bus bars adjacent to the linear conductors, wherein each of the linear conductors is electrically connected to a predetermined bus bar via a cut and raised conductor which is cut and raised by a notch of a necessary length in a predetermined portion along a longitudinal direction of the insulation resin part.

According to the aspect (1), both the outer periphery of the plurality of linear conductors and the side edges of the plurality of bus bars are integrally covered by the insulation resin part. Thus, the plurality of bus bars joined via the insulation resin part are integrally arranged at the predetermined interval along the plurality of linear conductors. Accordingly, an insulation member such as an insulation frame body for arranging the plurality of bus bars in the battery module can be eliminated, without degrading mounting workability at a time of assembling the battery wiring module with the battery module. In this manner, as it is not necessary to prepare the insulation members as dedicated components for every kinds of the battery pack, versatility of the battery wiring module can be improved and a manufacturing cost thereof can be reduced.

In the battery wiring modules configured in this manner, the plurality of linear conductors and the insulation resin part covering the linear conductors are formed in a flat cable shape. The notches, each having the necessary length and required for the connection with the predetermined bus bar, are formed at respective predetermined portions of the insulation resin part covering the linear conductors along the longitudinal direction of the insulation resin part. Each of the notches is constituted of a pair of parallel portions each cut in parallel to the linear conductors and an orthogonal portion for coupling both the one ends of the pair of parallel portions, thus forming the almost U-shaped notch. According to this almost U-shaped notch, the pair of parallel portions sandwich the linear conductor at the predetermined portion of the insulation resin part and the orthogonal portion cuts the linear conductor 21 thus sandwiched, thereby separating this linear conductor. In this manner, the linear conductor notched by the corresponding notch at the predetermined portion of the insulation resin part is cut at the orthogonal portion and separated from the insulation resin part by the parallel portions. Therefore this linear conductor thus separated can be raised as the cut and raised conductor. As a result, each of the bus bars can be electrically connected to the predetermined linear conductor by the simple work of forming the notch of the necessary length at the predetermined portion of the insulation resin part, then raising the cut and raised conductor thus separated by the notch and connecting the tip of the cut and raised conductor to the corresponding bus bar.

Each of the linear conductors on a side (downstream side) opposite the corresponding cut and raised conductor with respect to the corresponding orthogonal portion becomes nonconductive and hence is not necessary for electrical connection. In contrast, this nonconductive conductor remains as a nonconductive wire and is integrated with other linear conductors in a state of being covered by the insulation resin part. That is, the insulation resin part of the flat cable shape does not reduce in its width in the arrangement direction of the linear conductors. Thus as compared with structure in which each of the linear conductors is removed on the downstream side thereof, a bus-bar holding area of the flat cable becomes large. As a result, as each of the battery wiring modules can ensure the shape holding force.

In an aspect (2), one or more embodiments provide a manufacturing method for a battery wiring module to be combined with a battery module including a plurality of battery cells stacked in a state of being alternatively reversed so that a positive electrode terminal and a negative electrode terminal are adjoined between adjacent battery cells. According to the manufacturing method, the battery wiring module is manufactured by:

arranging a long plate-shaped conductor in parallel with a plurality of linear conductors along to at least one side of the plurality of linear conductors, wherein the plurality of linear conductors are arranged in parallel at a predetermined interval;

covering both an outer periphery of the plurality of linear conductors and a side edge of the plate-shaped conductor adjacent to the plurality of linear conductors with an insulation resin part integrally formed by extrusion molding;

punching a plurality of slits at a predetermined interval along a longitudinal direction of the plate-shaped conductor in order to form a plurality of bus bars for electrically connecting the positive electrode terminal and the negative electrode terminal adjacent to each other; and electrically connecting each of the plurality of linear conductors to the predetermined bus bar via a cut and raised conductor which is cut and raised by a notch of a necessary length in a predetermined portion along a longitudinal direction of the insulation resin part.

According to the aspect (2), in the covering process, both the outer periphery of the plurality of linear conductors and the side edge of the long plate-shaped conductor are covered by the insulation resin part integrally formed by the extrusion molding. By doing so, a flat circuit body, in which the plurality of linear conductors and the plate-shaped conductor are integrally arranged in parallel, is formed. As the flat circuit body is continuously formed by the extrusion molding, a manufacturing cost can be reduced easily.

In the punching process, the plurality of slits are punched out at the predetermined interval along the longitudinal direction of the plate-shaped conductor of the flat circuit body. Thus, the plurality of bus bars joined via the insulation resin are arranged integrally along the plurality of linear conductors.

In the bus bar, the interval of the slits, a space between the pair of the terminal through holes passing the positive and negative electrode terminals and the inner diameter of this through hole can be suitably changed according to a size or the like of the battery cell. Thus, as the bus bars thus changed depending on the size or the like of the battery cell can be formed easily, the battery wiring module of a quite high versatility can be obtained.

Further, in the connection process, each of the bus bars can be electrically connected to the predetermined linear conductor by the simple work of raising the cut and raised conductor, which is obtained by raising the predetermined portion of the insulation resin part separated by the notch of the necessary length, and connecting a tip of the cut and raised conductor to the bus bar.

Further, as the plurality of bus bars are integrally arranged via the insulation resin along the linear conductors, mounting workability at the time of assembling the battery wiring modules with the battery module can be prevented from being degraded. Of course, it is not necessary to separately prepare a member for arranging the plurality of bus bars on the battery module.

In an aspect (3), one or more embodiments provide a manufacturing method for a battery wiring module to be combined with a battery module including a plurality of battery cells stacked in a state of being alternatively reversed so that a positive electrode terminal and a negative electrode terminal are adjoined between adjacent battery cells. According to the manufacturing method, the battery wiring module is manufactured by:

arranging a plurality of bus-bars in parallel with a plurality of linear conductors along to at least one side of the plurality of linear conductors, wherein the plurality of linear conductors are arranged in parallel at a predetermined interval so that a positive electrode terminal and a negative electrode terminal are adjoined between the adjacent battery cells;

hot pressing a bus bar connection part (23a) of an insulation resin part to side edges of the plurality of bus bars adjacent to the plurality of linear conductors, wherein the insulation resin part includes a covering part covering an outer periphery of the plurality of linear conductors; and electrically connecting each of the plurality of linear conductors to the predetermined bus bar via a cut and raised conductor which is cut and raised by a notch of a necessary length in a predetermined portion along a longitudinal direction of the insulation resin part.

According to the method of fabricating the battery wiring module arranged in (3), in the hot press process, the bus bar connection part of the insulation resin part, having the covering part for covering the outer periphery of the plurality of linear conductors, is welded to the side edges of the plurality of bus bars by the hot press. Thus the plurality of bus bars joined via the insulation resin are integrally arranged along the plurality of linear conductors. In the bus bars, the interval of the bus bars, a space between the pair of the terminal through holes passing the positive and negative electrode terminals and the inner diameter of this through hole can be suitably changed according to a size or the like of the battery cell. Thus, as the bus bars thus changed depending on the size or the like of the battery cell can be formed easily, the battery wiring module of a quite high versatility can be obtained.

Further, in the connection process, each of the bus bars can be electrically connected to the predetermined linear conductor by the simple work of forming the notch of the necessary length at the predetermined portion of the insulation resin part, then raising the cut and raised conductor thus separated by the notch and connecting a tip of the cut and raised conductor o the corresponding bus bar.

Further, as the plurality of bus bars are integrally arranged along the linear conductors via the insulation resin, mounting workability at the time of assembling the battery wiring module with the battery module can be prevented from being degraded. Of course, it is not necessary to separately prepare a member for arranging the plurality of bus bars on the battery module.

According to the battery wiring module and the fabrication method thereof according to the invention, wiring to the respective battery cells can be performed easily with simple configuration, and also versatility can be improved and a manufacturing cost can be reduced As described above, the invention is explained briefly. Further, details of the invention will be more clarified by thoroughly reading, with reference to accompanying drawings, modes for carrying out the invention (hereinafter referred to "embodiments") explained below.

DETAILED DESCRIPTION OF THE EMBODIMENTS

Hereinafter, embodiments will be exclaimed with reference to drawings.

Figure 1:
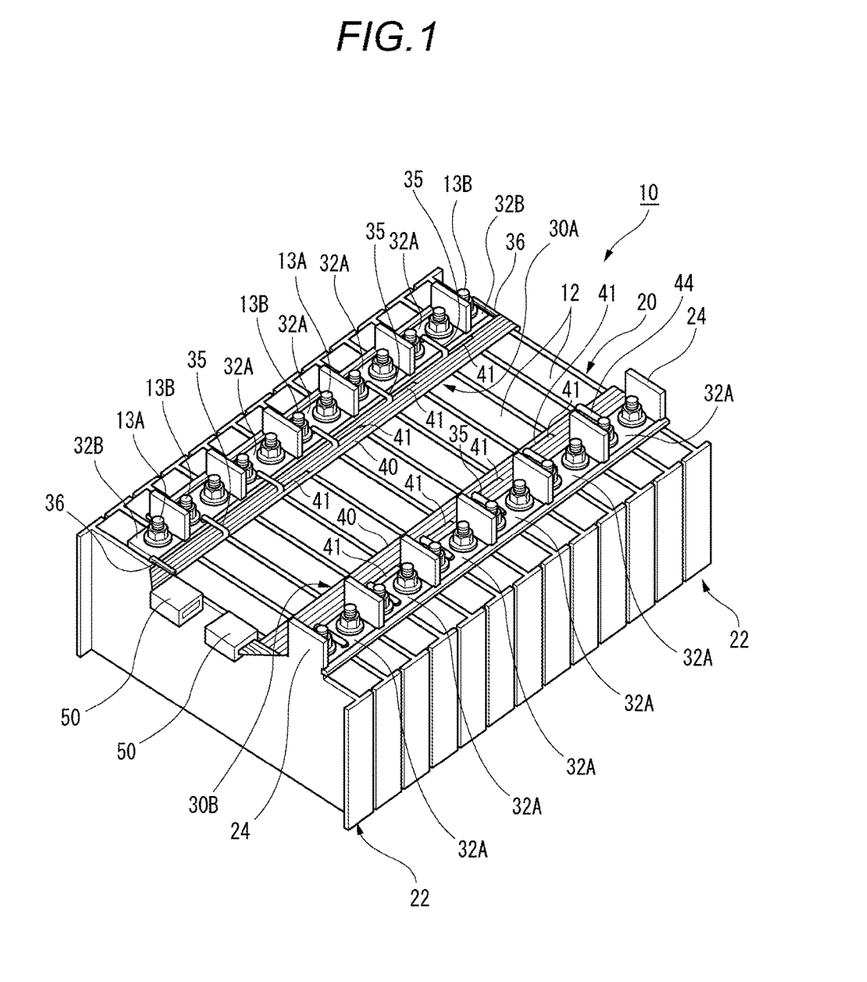
FIG. 1 is an entire perspective view of a battery pack combined with battery wiring modules according to a first embodiment.
Figure 2:
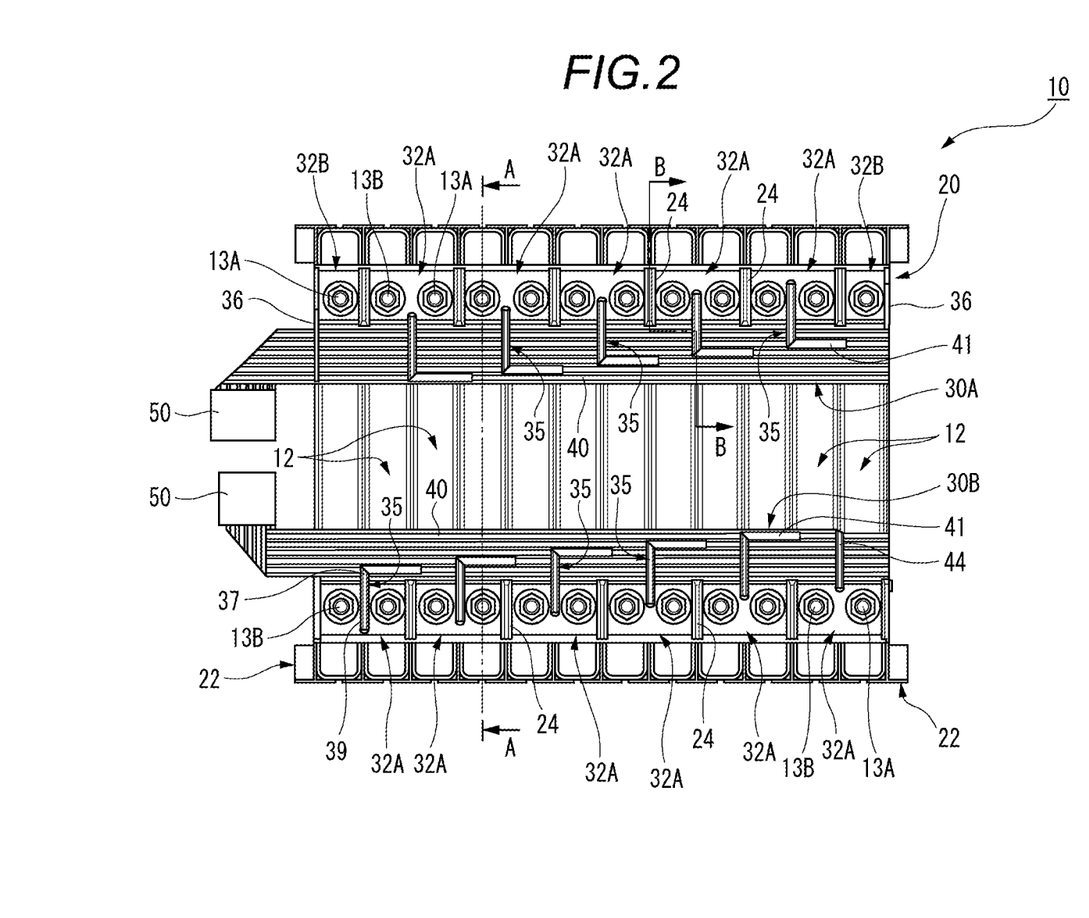
FIG. 2 is a plan view of the battery pack shown in FIG. 1.
Figure 3A:
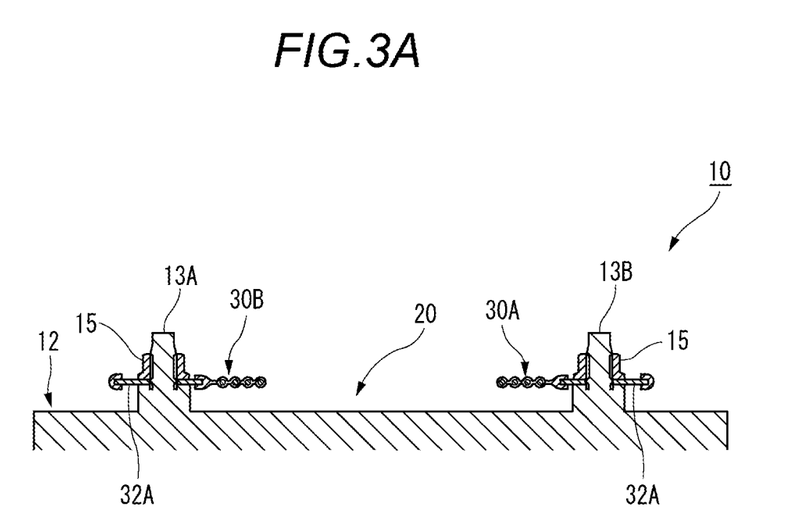
FIG. 3A is a sectional view of a main part of the battery pack taken along line A-A in FIG. 2
Figure 3B:
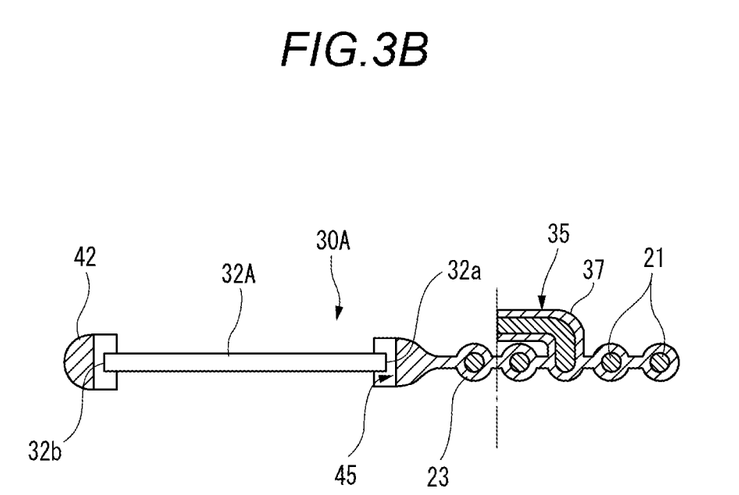
FIG. 3B is a sectional view of the battery wiring module taken along line B-B in FIG. 1.

As shown in FIGS. 1 to 3, a battery pack 10 configured by combining battery wiring modules 30A, 30B according to a first embodiment is used as a driving source for, for example, an electric car or a hybrid car or the like. The battery pack includes a battery module 20 having a plurality of battery cells 12 arranged in a side-by-side manner. The battery module 20 is configured in a manner that the plurality of battery cells 12 are arranged and fixed via separators therebetween within a not-shown box-shaped casing.

The battery wiring modules 30A, 30B according to the first embodiment are constituted of a plurality of bus bars 32A, 32B which connect the plurality of battery cells 12 in series, voltage detection wires 40 for measuring voltages of the respective battery cells 12, and connectors 50 connected to one ends of the respective voltage detection wires 40.

Figure 7:
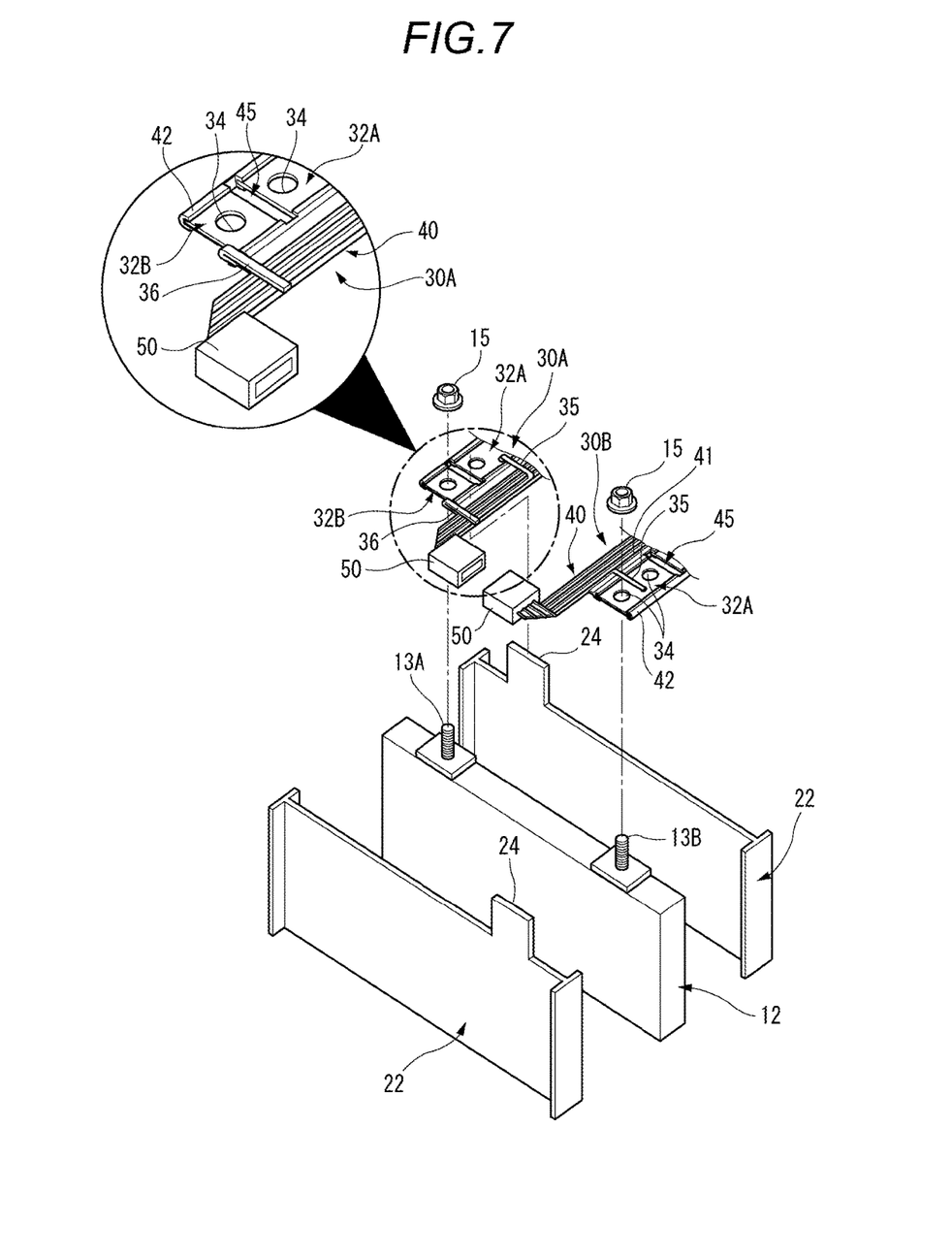
FIG. 7 is an exploded perspective view of a main part of the battery pack shown in FIG. 1.

Each of the battery cells 12 is a secondary battery, and has a positive electrode terminal 13A and a negative electrode terminal 13B each protruding from an upper surface thereof as shown in FIG. 7. In a case of disposing the battery cells within the casing, as shown in FIG. 2, the battery cells 12 are laminated in a manner of being alternatively reversed so that the positive electrode terminal 13A and the negative electrode terminal 13B are adjoined between the adjacent battery cells. The positive electrode terminal 13A and negative electrode terminal 13B of the battery cell are fastened by nuts 15 via the bus bars 32A, 32S, respectively.

Separators 22 made of insulation resin shown in FIG. 7 are disposed at both sides of each of the battery cells 12, respectively. A partition part 24 protruding upward than an upper surface of the battery cell 12 is formed at an upper end of the separator 22. The partition part 24 is disposed in a slit (space) 45 formed between the adjacent bus bars 32A, 32B, thus preventing short-circuit between the electrodes due to a tool.

As shown in FIG. 2, the battery wiring modules 30A and 30B each having a belt-shape are disposed on the plurality of battery cells 12 along an arrangement direction of the battery cells 12.

The battery wiring modules 30A and 30B are disposed in two rows along the arrangement direction of the battery cells 12. In the battery wiring modules 30A and 30B, a plurality of the bus bars 32A, 32B are arranged in two rows on the positive electrode terminals 13A and the negative electrode terminals 13B that are arranged alternatively along the arrangement direction of the battery cells 12. Further, the voltage detection wires 40 are arranged in parallel on the inner sides of respective bus bar rows constituted by the bus bars 32A, 32B.

The bus bars 32A, 32B constituting each of the battery wiring modules 30A and 30B are configured that terminal through holes 34 for passing and connecting the positive electrode terminals 13A and the negative electrode terminals 13B are arranged in one row. In the rear side bus bar row among the two bus bar rows shown in FIG. 2, the bus bar 32B having a single hole constituted of the terminal through hole 34 is provided at each of both ends of this bus bar row, and the bus bar 32A having two holes constituted of the two terminal through holes 34 is provided five between the two bus bars 32B. In contrast, in the near side bus bar row among the two bus bar rows shown in FIG. 2, the bus bar 32A having the two holes are provided six.

Figure 5A:
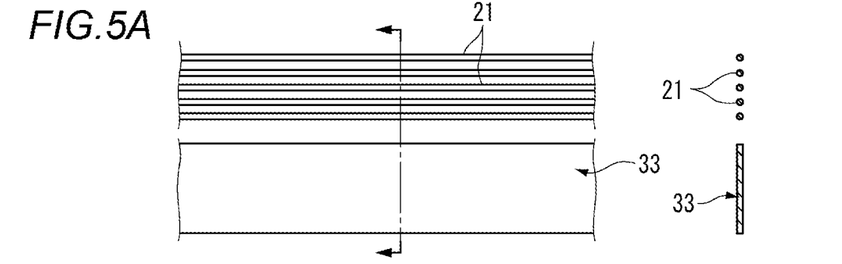
FIGS. 5A to 5D are plan views and cross sectional views of a main part of the battery wiring module shown in FIG. 1, for explaining a fabrication process of the battery wiring module.
Figure 5B:
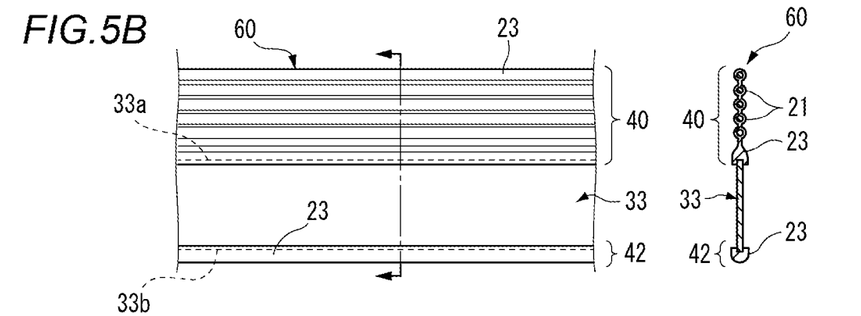
Figure 5C:
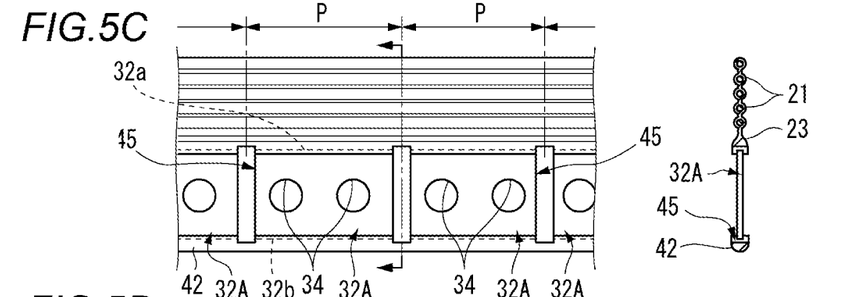

As shown in FIG. 5C, each of the bus bars 32A, 32B has an almost rectangular shape. In each of the bus bars 32A, the terminal through holes 34 for passing the positive electrode terminal 13A and the negative electrode terminal 13B therethrough are formed, respectively. Further, in a pair of the bus bars 32B, the terminal through holes 34 for passing the positive and negative electrode terminals 13A, 13B therethrough are formed, respectively. The bus bars 32A, 32B are formed, in a punching process described later, by punching a long plate-shaped conductor 33 constituted of a metal plate made of copper, copper alloy, aluminum, aluminum alloy, gold, stainless steel (SUS) or the like. Each of the bus bars 32A, 32B may be subjected to a plating treatment using Sn, Ni, Ag, Au or the like in order to improve welding property.

Incidentally, each of the bus bars 32A, 32B according to the embodiment is electrically connected to the respective electrode terminals by screwing and fastening the nuts 15 on the positive electrode terminal 13A and the negative electrode terminal 13B passing the respective terminal through holes 34. Of course, each of the bus bars according to the invention may be electrically connected to the positive and negative electrode terminals by being welded to the respective electrode terminals, without forming the terminal through holes 34.

The voltage detection wire 40 constituting each of the battery wiring modules 30A and 30B is formed in a manner that, in a covering process described later, an outer periphery of a plurality of linear conductors 21 arranged in parallel with a predetermined space is covered by an insulation resin part 23 (for example, insulation resin such as polypropylene (PP), polyvinyl chloride (PVC), polybutylene terephthalate (PBT), polyethylene terephthalate (PET)) integrally formed by extrusion molding and thus formed in a flat cable shape. As the linear conductor according to the invention, various kinds of conductors such as a single wire of a flat conductor or a round conductor or a twisted wire may be used.

In each of the battery wiring modules 30A and 30B according to the first embodiment, both a side edge 32a of each of the bus bars 32A, 32B adjacent to the linear conductors 21 and a side edge 32b of each of these bus bars opposite the side edge 32a are covered by the insulation resin part 23 integrally formed by the extrusion molding. Thus, the plurality of the bus bars 32A, 32B, which side edges 32a adjacent to the linear conductors 21 are joined to the voltage detection wire 40 via the insulation resin part 23, are integrally disposed along one side of the voltage detection wire 40 at a predetermined interval. The insulation resin part 23 covering the side edges 32b on the opposite sides of the bus bars 32A, 32B constitutes a coupling part 42 continuing in the longitudinal direction thereof. The coupling part 42 joins the respective side edges 32b on the opposite sides of the bus bars 32A, 32B to suppress the bus bars 32A, 32B scattering, thus preventing reduction of a joining strength with the voltage detection wire 40. Of course, the coupling part 42 can be eliminated if the joining strength between the voltage detection wire 40 and the bus bars 32A, 32B is a sufficient value.

Each of the bus bars 32A of the battery wiring modules 30A, 30B electrically connects between the positive electrode terminal 13A and the negative electrode terminal 13B adjacent to each other and is electrically connected to corresponding one of the linear conductors 21 of the voltage detection wire 40 for measuring a voltage of the corresponding battery cell 12.

Each of the bus bars 32A according to the first embodiment, except for the bus bar corresponding to the end portion of the linear conductors, is connected to corresponding one of the linear conductors 21 of the voltage detection wire 40 by means of a cut and raised conductor 35. Each of the cut and raised conductors 35 is formed in a manner that the insulation resin part 23 is cut at a predetermined portion thereof by a necessary length along the longitudinal direction to thereby form a notch 41 (see FIG. 4) and then a part of the insulation resin part separated by this notch is raised. The notch 41 is configured to have an almost U-shape (see FIG. 9A) by a pair of parallel portions 41a each cut in parallel to the linear conductors 21 and an orthogonal portion 41b for coupling both one ends of the pair of parallel portions 41a.

Figure 4:
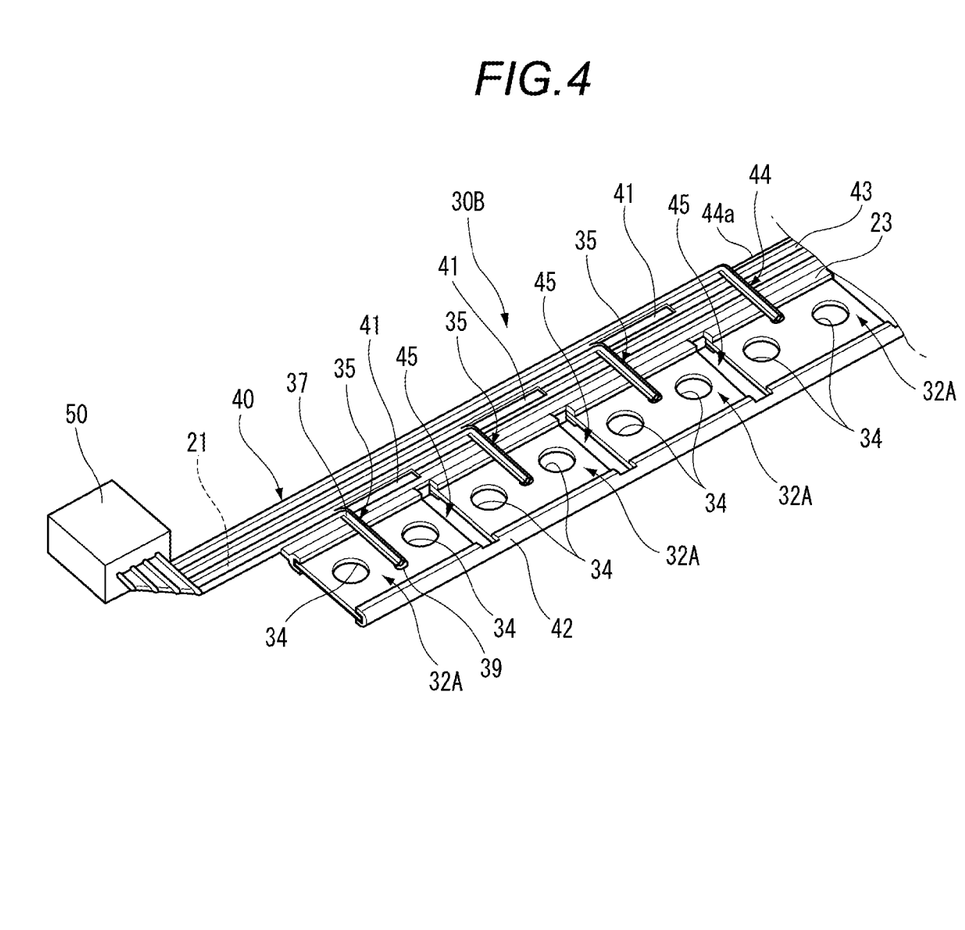
FIG. 4 is a perspective view of the battery wiring module according to the first embodiment.

Then as shown in FIG. 3B, a welding part 39 of the cut and raised conductor 35 is connected by welding to the predetermined bus bar 32A in a state that a bent part 37 of the cut and raised conductor continues to the predetermined linear conductor 21 (see FIG. 4). Incidentally, the "connection by welding" in this embodiment includes various kinds of known welding connection such as spot welding, ultrasonic welding and laser welding.

Further in each of the battery wiring modules 30A and 30B according to the first embodiment, the bus bar 32A corresponding to the end portion 43 of the linear conductors 21 is connected to corresponding one of the linear conductors 21 on a side thereof opposite this bus bar, via a cut and raised conductor 44 (see FIG. 4). The cut and raised conductor 44 is formed in a manner that the insulation resin part 23 is cut along this corresponding linear conductor 21 from the end portion 43 as a predetermined portion of the insulation resin part 23 to thereby form a linear notch 44a (see FIG. 9A) and then a part of the insulation resin part separated by this notch is raised.

Further, each of the bus bars 32B of the battery wiring module 30A is electrically connected to the positive electrode terminal 13A or the negative electrode terminal 13B at corresponding one of the both ends of this module, and also electrically connected to the corresponding one of the linear conductors 21 of the voltage detection wire 40 for measuring a voltage of the corresponding battery cell 12.

The bus bar 32B in this embodiment is connected to the corresponding one of the linear conductors 21 of the voltage detection wire 40 via a cut and raised piece 36 formed at a side edge of the bus bar 32B. The cut and raised piece 36 is formed by being bent along the side edge of the bus bar 32B, and a tip of this piece is connected to the predetermined linear conductor 21 by welding (see FIG. 7). The predetermined linear conductor 21, to which the tip is welded, canoe selected by suitably changing the bent position of the cut and raised piece 36 to thereby change a protruded position of the tip. Alternatively, in a case of welding an intermediate portion of this piece to the predetermined linear conductor, the predetermined linear conductor 21 can be selected by suitably changing the welding position of this piece without changing the bent position. Incidentally, the connection between the bus bar 32B and the corresponding linear conductor 21 of the voltage detection wire 40 is not limited to be achieved by the cut and raised piece 36 but may be achieved by the cut and raised conductor 44.

Next, a method of fabricating the battery wiring modules 30A, 30B having the aforesaid configuration will be explained. Incidentally, as each of the battery wiring modules 30A, 30B is fabricated by substantially the same fabrication process, the fabrication method will be explained as to the battery wiring module 30B as an example.

The battery wiring module 30B according to the first embodiment is formed by a fabricating method including an arrangement process (see FIG. 5A) of arranging the long plate-shaped conductor 33 along and in parallel to the one side of the plurality of linear conductors 21 that are arranged in parallel with the predetermined space; a covering process (see FIG. 5B) of covering both an outer periphery of the plurality of linear conductors 21 and a side edge 33a of the plate-shaped conductor 33 adjacent to the linear conductors 21 by the insulation resin part 23 integrally formed by the extrusion molding; the punching process (see FIG. 5C) of punching a plurality of slits 45 at a predetermined interval and also punching terminal through holes 34 along the longitudinal direction of the plate-shaped conductor 33 to thereby form the plurality of bus bars 32A each for electrically connecting the positive electrode terminal 13A and the negative electrode terminal 13B adjacent to each other; and a connection process (see FIG. 5D) of electrically connecting each of the plurality of linear conductors 21 to the predetermined bus bar 32A, by means of the corresponding cut and raised conductor 35, 44 which is obtained by raising the predetermined portion of the insulation resin part 23 separated by the corresponding notch 41, 44a of the necessary length cut along the longitudinal direction of the insulation resin part.

Firstly, in the arrangement process and the covering process shown in FIGS. 5A and 5B, the insulation resin part 23 is formed by the extrusion molding so as to cover the outer periphery of the plurality of linear conductors 21 and both the side edge 33a of the plate-shaped conductor 33 adjacent to the linear conductors 21 and a side edge 33b of the plate-shaped conductor opposite the side edge 33a, using a known extruder employing an extrusion molding die having a die opening which can arrange the plurality of linear conductors 21 and the long plate-shaped conductor 33 in parallel with a predetermined distance therebetween.

That is, both the outer periphery of the plurality of linear conductors 21 and the side edges 33a, 33b of the plate-shaped conductor 33 are covered by the insulation resin part 23 integrally formed by the extrusion molding. By doing so, a flat circuit body 60, in which the plurality of linear conductors 21 constituting the voltage detection wire 40 of the flat cable shape and the plate-shaped conductor 33 are integrally arranged in parallel, is formed (see FIG. 5B).

Next in the punching process shown in FIG. 5O, after the flat circuit body 60 is cut in a desired longitudinal length, the plurality of slits 45 are punched out with the predetermined interval P and also the terminal through holes 34 are punched out along the longitudinal direction of the plate-shaped conductor 33 in the flat circuit body 60, and hence the plurality of bus bars 32A are formed.

In this case, a longitudinal length of each of the slits 45 is set so that the adjacent bus bars 32A are surely separated to each other.

Incidentally, the punching process can be performed by suitably changing the interval P of the slits 45, the space between the pair of the terminal through holes 34 and the inner diameter of this through hole according to a size or the like of the battery cell 12. By doing so, several kinds of the battery wiring module 30B different in specification can be formed using the single kind of flat circuit body 60.

Figure 5D:
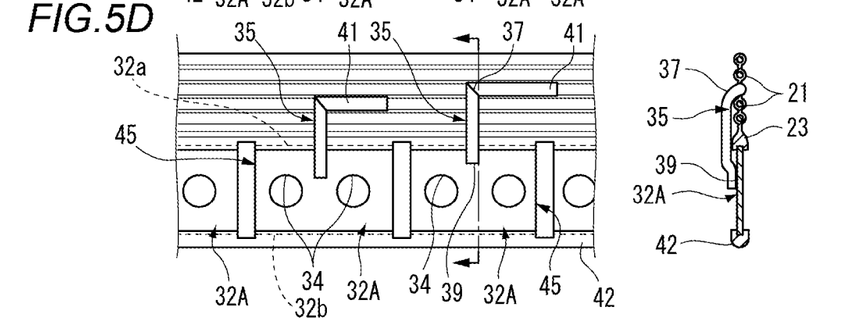
Figure 6:
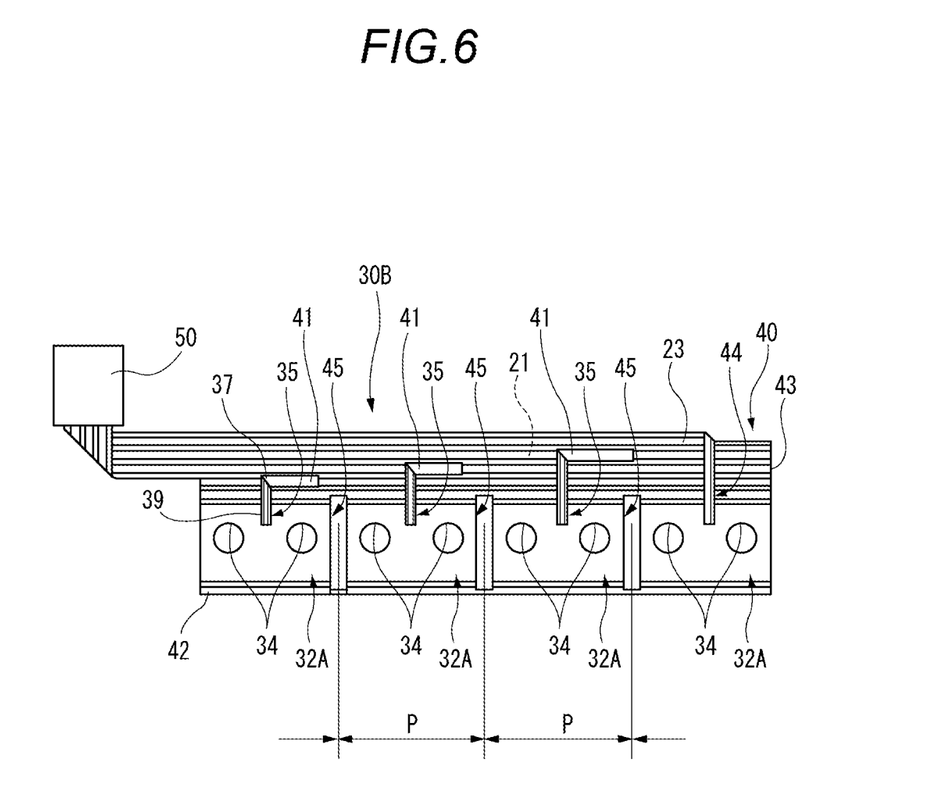
FIG. 6 is a plan view of the battery wiring module.

Next, in the connection process shown in FIG. 5D, the plurality of linear conductors 21 are electrically connected to the predetermined bus bars 32A by means of the cut and raised conductors 35, 44, respectively. As described above, each of the cut and raised conductors 35, 44 is obtained by raising the predetermined portion of the insulation resin part 23 separated by the notch 41, 41a of the necessary length. In each of the cut and raised conductors 35, 44, the bent part 37 continues to the predetermined linear conductor 21 and the other end acting as the welding part 39 is connected by welding to the predetermined bus bar 32A. Both the notches 41 each having the almost U-shape and the linear notch 44a can be formed simultaneously in the punching process of punching both the slits 45 and the terminal through holes 34. Alternatively, these notches 41, 44a may be separately formed in the connection process after punching both the slits 45 and the terminal through holes 34.

Then, the battery wiring module 30B is completed by connecting and fixing the connector 50 to the one end of the voltage detection wire 40.

The battery wiring modules 30A, 30B configured in this manner are mounted on an upper surface of the battery module 20 in which the twelve battery cells 12 are arranged in the side-by-side manner so that the positive electrode terminal 13A and the negative electrode terminal 13B having the opposite polarities are adjoined between the adjacent battery cells.

Next, as shown in FIG. 7, all the positive electrode terminals 13A and the negative electrode terminals 13B of the plurality of battery cells 12 arranged in the side-by-side manner are inserted into all the terminal through holes 34 of the bus bars 32A, 32B, respectively. Also the partition parts 24 of the separators 22 are inserted into the slits 45, respectively.

Then, the respective nuts 15 are screwed and fastened on the positive electrode terminals 13A and the negative electrode terminals 13B protruded from the terminal through holes 34. When all the positive electrode terminals 13A and the negative electrode terminals 13B are fastened by the respective nuts 15, the battery pack 10 in which the battery wiring modules 30A and 30B are mounted on the battery module 20 is completed.

In this manner, in the battery wiring module 30A, 30B according to the first embodiment, both the outer periphery of the plurality of linear conductors 21 and the side edges 32a of the plurality of bus bars 32A, 32B are integrally covered by the insulation resin part 23. Thus, the plurality of bus bars 32A, 32B joined via the insulation resin part 23 are integrally arranged with the predetermined interval along the plurality of linear conductors 21. Accordingly, an insulation member such as an insulation frame body for arranging the plurality of bus bars 32A, 32B in the battery module 20 can be eliminated, without degrading mounting workability at a time of assembling the battery wiring module 30A, 30B with the battery module 20. In this manner, as it is not necessary to prepare the insulation members as dedicated components for every kinds of the battery pack 10, versatility of the battery wiring module 30A, 30B can be improved and a manufacturing cost thereof can be reduced.

Further, in the fabricating method of the battery wiring module 30A, 30B according to the first embodiment, in the covering process, both the outer periphery of the plurality of linear conductors 21 and the side edges 33a, 33b of the long plate-shaped conductor 33 are covered by the insulation resin part 23 integrally formed by the extrusion molding. By doing so, the flat circuit body 60, in which the plurality of linear conductors 21 and the plate-shaped conductor 33 are integrally arranged in parallel, is formed. As the flat circuit body 60 is continuously formed by the extrusion molding using the not-shown known extruder, a manufacturing cost can be reduced easily.

Further, in the punching process, the plurality of slits 45 are punched out with the predetermined interval P along the longitudinal direction of the plate-shaped conductor 33 in the flat circuit body 60. By doing so, the plurality of bus bars 32A, 32B joined via the insulation resin part 23 are integrally arranged along the plurality of linear conductors 21.

In the plurality of bus bars 32A, 32B, the interval P of the slits 45, the space between the pair of the terminal through holes 34 passing the positive and negative electrode terminals 13A, 13B and the inner diameter of this through hole can be suitably changed according to the size or the like of the battery cell 12. Thus, as the bus bars thus changed depending on the size or the like of the battery cell can be formed easily, the battery wiring modules 30A, 30B of a quite high versatility can be obtained.

Further, in the connection process, each of the bus bars 32A can be electrically connected to the predetermined linear conductor 21 by the simple work of raising the cut and raised conductor 35, 44, which is obtained by raising the predetermined portion of the insulation resin part 23 separated by the notch 41, 44a of the necessary length, and connecting a tip of the cut and raised conductor 35, 44 to the bus bar 32A.

Further, as the plurality of bus bars 32A are integrally arranged via the insulation resin along the linear conductors 21, mounting workability at the time of assembling the battery wiring modules 30A and 30B with the battery module 20 can be prevented from being degraded. Of course, it is not necessary to separately prepare a member for arranging the plurality of bus bars 32A on the battery module 20.

A battery wiring module according to a comparative example will be explained.

In the battery wiring module 90 according to the comparative example, like the battery wiring module 30B according to the first embodiment, a long flat circuit body 60 is formed in an arrangement process and a covering process (see FIG. 5B).

Figure 8A:
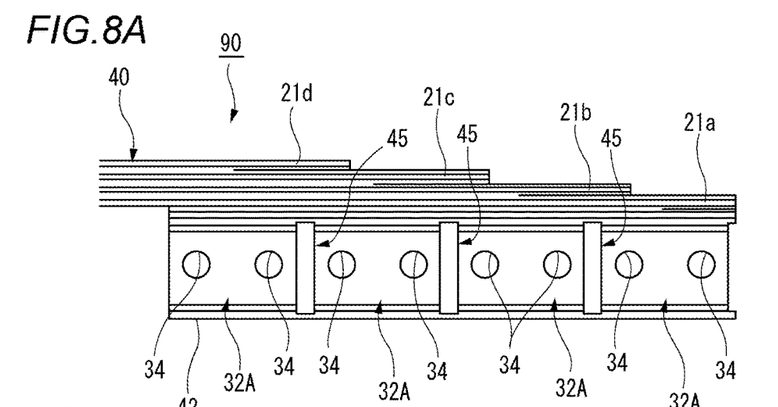
FIGS. 8A and 8B are partial plan views of the battery wiring module according to a comparative example and FIG. 8C is a sectional view along C-C of FIG. 8B showing a bent state of the module due to reduction of a shape holding force.

Then, the flat circuit body 60 is cut in a desired longitudinal length. Thereafter in a punching process, at a time of punching a plurality of slits 45 and terminal through holes 34 along the longitudinal direction of a plate-shaped conductor 33 in the flat circuit body 60, a part of a voltage detection wire 40 and a remaining area of the plate-shaped conductor 33 except for four bus bars 32A are punched out, as shown in FIG. 8A.

Respective end parts 21a, 21b, 21c and 21d as one ends of a plurality of linear conductors 21 of the voltage detection wire 40 arranged in parallel to the four bus bars 32A are formed in a staircase pattern rising to the left side from the right side. That is, the end part 21a of the linear conductor 21 on the nearest side has the longest size, whilst the end part 21d of the linear conductor 21 on the most rear side has the shortest size.

Figure 8B:
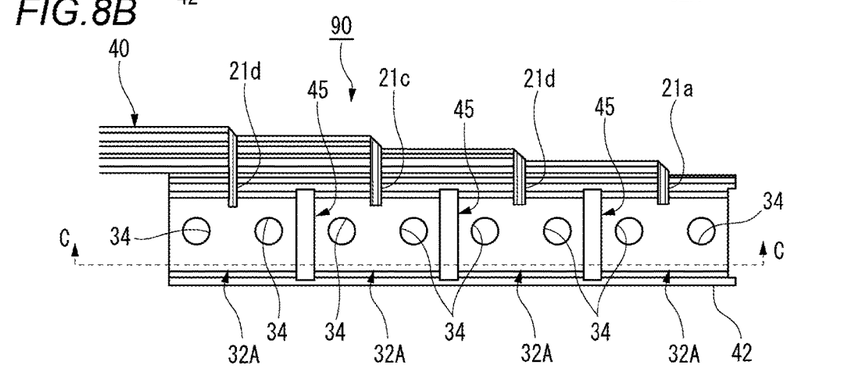

Next, as shown in FIG. 8B, in a connection process, the end parts 21a, 21b, 21c and 21d of the plurality of linear conductors 21 covered by an insulation resin part 23 are separated from one another in a manner of separating the linear conductors 21 from one another while remaining the other ends thereof. Then, each of the end parts 21a, 21b, 21c and 21d is bent substantially orthogonally toward corresponding one of the four bus bars 32A and connected to the corresponding bus bar 32A by welding.

Thereafter, the battery wiring module 90 is completed by connecting a connector 50 to one end of the voltage detection wire 40.

In this manner, according to the battery wiring module 90 according to the comparative example, the bus bar 32A can be electrically connected to the predetermined linear conductor 21 by the simple work of separating the insulation resin part 23 among the respective linear conductors 21 and then welding the end parts 21a, 21b, 21c and 21d of the linear conductors 21 to the respective bus bars 32A.

Figure 8C:
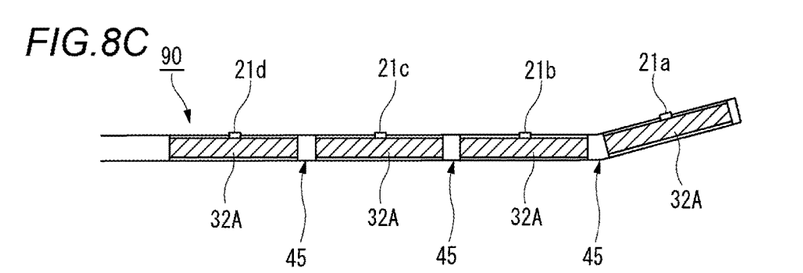

However, in the battery wiring module 90 according to the comparative example, the voltage detection wire 40 is cut in the staircase pattern, then the linear conductors thus separated are bent and connected to the respective bus bars 32A. By doing so, as a bus-bar holding area of the flat cable becomes small a shape holding force of the flat cable reduces. As a result, as shown in FIG. 5C, a portion of the flat cable on a tip side of the slit 45 having the small bus-bar holding area bends easily.

Figure 9A:
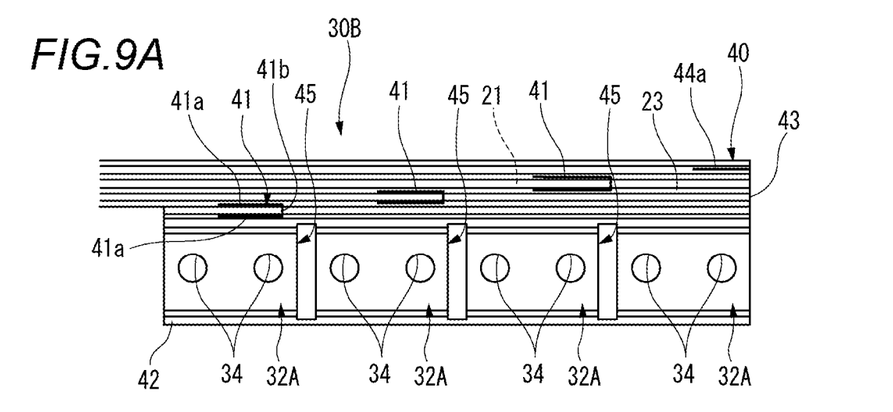
FIGS. 9A and 9B are partial plan views of the battery wiring module according to the first embodiment and FIG. 9C is a sectional view along D-D of FIG. 9B showing a not-bent state of the module due to secure of a shape holding force.
Figure 9B:
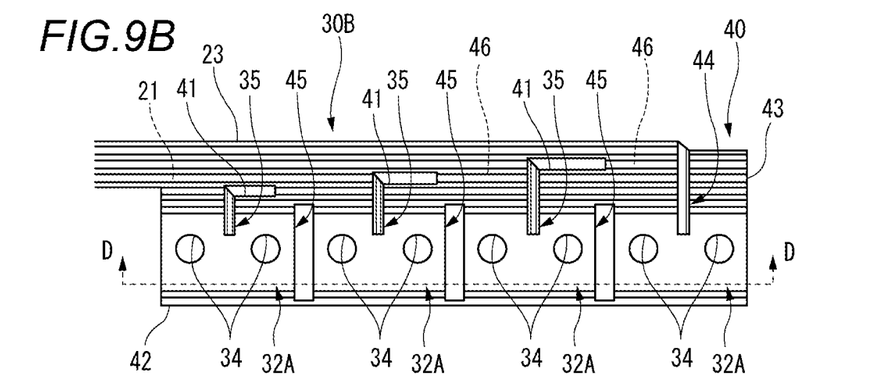

In contrast, in the battery wiring modules 30A, 30B according to the first embodiment, as shown in FIG. 9A, the notches 41, each having the necessary length and required for the connection with the predetermined bus bar 32A, are formed at respective predetermined portions of the insulation resin part 23 covering the linear conductors 21 along the longitudinal direction of the insulation resin part 23. Each of the notches 41 is constituted of the pair of parallel portions 41a each cut in parallel to the linear conductors 21 and the orthogonal portion 41b for coupling both the one ends of the pair of parallel portions 41a, thus forming the almost U-shaped notch. According to this U-shaped notch 41, the pair of parallel portions 41a sandwich the corresponding linear conductor 21 at the predetermined portion of the insulation resin part and the orthogonal portion 41b cuts the corresponding linear conductor 21 thus sandwiched, thereby separating this linear conductor. In this manner, the linear conductor 21 notched by the corresponding notch 41 at the predetermined portion of the insulation resin part is cut at the orthogonal portion 41*b* and separated from the insulation resin part 23 by the parallel portions 41*a*. This linear conductor thus separated can be raised as the cut and raised conductor 35. As a result, each of the bus bars 32A can be electrically connected to the predetermined linear conductor 21 by the simple work of forming the notch 41 of the necessary length at the predetermined portion of the insulation resin part 23, then raising the cut and raised conductor 35 thus separated by the notch and connecting the tip of the cut and raised conductor 35 to the corresponding bus bar 32A.

Figure 9C:
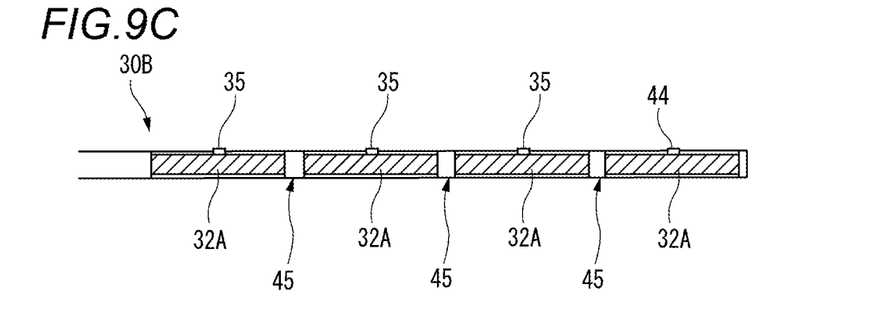

Each of the linear conductors 21 on a side (downstream side) opposite the corresponding cut and raised conductor 35 with respect to the corresponding orthogonal portion 41*b* becomes nonconductive and hence is not necessary for electrical connection. In contrast, this nonconductive conductor remains as a nonconductive wire 46 and is integrated with other linear conductors in a state of being covered by the insulation resin part 23. That is, the insulation resin part 23 of the flat cable shape does not reduce in its width in the arrangement direction of the linear conductors 21, to a portion near the end portion 43 in the downstream side direction. Thus as compared with the structure of the comparative example in which each of the linear conductors 21 is removed on the dolqnstream side thereof, a bus-bar holding area of the flat cable becomes large. As a result, as each of the battery wiring modules 30A, 30B can ensure the shape holding force of the flat cable, the bending of the flat cable on the tip side of the slit 45 can be punched as shown in FIG. 9C.

Next, a method of fabricating a battery wiring module according to the second embodiment will be explained.

A battery wiring module 30C according to the second embodiment is formed by a fabricating method including an arrangement process (see FIG. 10A) of arranging a plurality of bus bars 32C in parallel with a predetermined interval along one side of a plurality of linear conductors 21 arranged in parallel with a predetermined space, in order to electrically connect a positive electrode terminal 13A and a negative electrode terminal 13B adjacent to each other; a hot press process (see FIG. 10B) of welding a bus bar connection part 23*a* of an insulation resin part 23, having a covering part 23*b* for covering the outer periphery of the plurality of linear conductors 21, to side edges 32*a* of the plurality of bus bars 32C adjacent to the plurality of linear conductors 21 by hot press; and a connection process (see FIG. 10C) of electrically connecting each of the linear conductors 21 to the predetermined bus bar 32C, by means of a corresponding cut and raised conductor 35, 44 which is obtained by raising a predetermined portion of the insulation resin part 23 separated by a corresponding notch 41, 44*a* of a necessary length cut along the longitudinal direction of the insulation resin part 23.

Figure 10A:
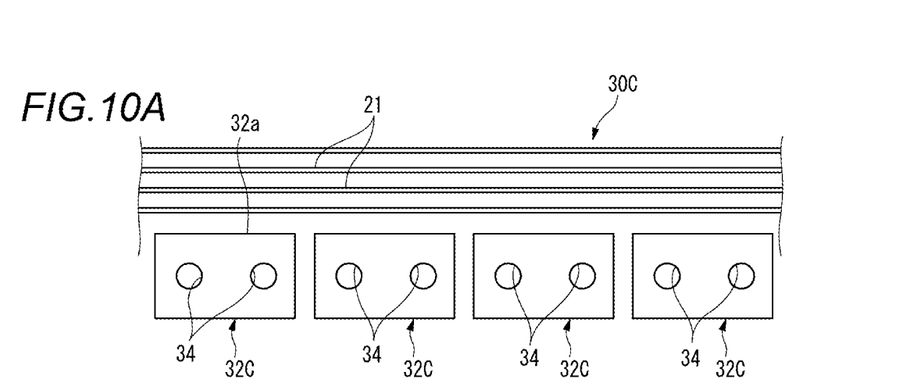
FIGS. 10A to 10C are plan views of a main part of the battery wiring module according to a second embodiment, for explaining a fabrication process of the battery wiring module.

Firstly as shown in FIG. 10A, in the arrangement process, the plurality of bus bars 32C are arranged in parallel with the predetermined interval along the one side of the plurality of linear conductors 21 which are arranged in parallel with the predetermined space. Each of the bus bars 32C has an almost rectangular shape. In each of these bus bars, terminal through holes 34 for passing the positive electrode terminal 13A and the negative electrode terminal 13B therethrough are formed, respectively. The bus bars 32C are formed, in a press process in advance, by pressing a metal plate made of copper, copper alloy, aluminum, aluminum alloy, gold, stainless steel (SUS) or the like.

Figure 10B:
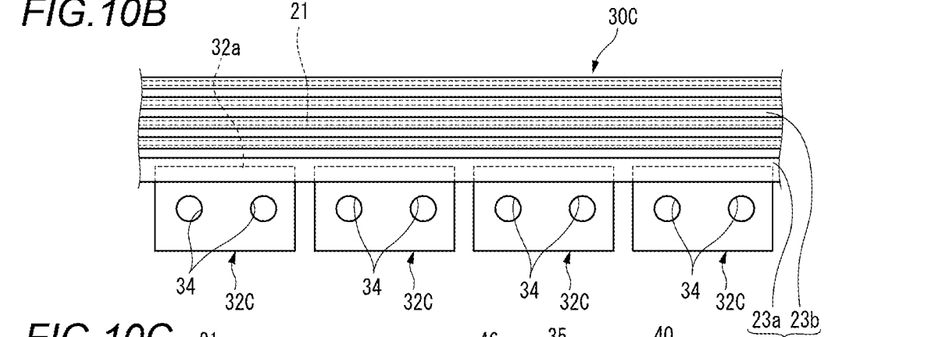

Next, in the hot press process shown in FIG. 10B, after side edges of the bus bars 32C are inserted into respective end face recesses of the bus bar connection part 23*a*, the bus bar connection part 23*a* is sandwiched between a pair of hot press plates (not shown) in a manner of being pressed with a predetermined pressure in a thickness direction thereof. The bus bar connection part 23*a* heated by the hot press plates is partially softened and welded on front and rear surfaces of the bus bars by the pressing forces from the respective hot press plates and thus fixed to the bus bars 32C.

By doing so, the long battery wiring module 30C, in which the plurality of linear conductors 21 constituting a voltage detection wire 40 of a flat cable shape and the bus bars 32C are integrally arranged in parallel, is formed.

Incidentally, in the battery wiring module 30C, the interval of the bus bars 32C, a space between a pair of the terminal through holes 34 and an inner diameter of this through hole can be suitably changed according to a size or the like of the battery cell 12. By doing so, various kinds of the battery wiring module 30C different in specification can be formed.

Figure 10C:
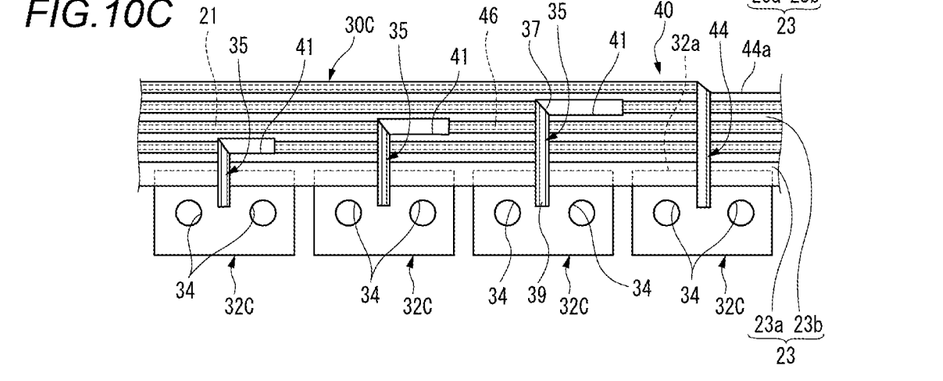

Next, in the connection process shown in FIG. 10C, the plurality of linear conductors 21 are electrically connected to the predetermined bus bars 32C by means of the cut and raised conductors 35, 44, respectively. Like the battery wiring module 30B according to the first embodiment, each of the cut and raised conductors 35, 44 is obtained by forming the notch 41, 44*a* of the necessary length at the predetermined portion of the insulation resin part 23 and raising the predetermined portion of the insulation resin part thus separated by the notch. In each of the cut and raised conductors 35, 44, a bent part 37 continues to the predetermined linear conductor 21 and the other end acting as a welding part 39 is connected by welding to the predetermined bus bar 32.

Then, the battery wiring module 30C is completed by connecting and fixing a connector 50 to the one end of the voltage detection wire 40.

That is, in the battery wiring module 30C according to the second embodiment, in the hot press process, the bus bar connection part 23*a* of the insulation resin part 23, having the covering part 23*b* for covering the outer periphery of the plurality of linear conductors 21, is welded to the side edges 32*a* of the plurality of bus bars 32C by the hot press. Thus the plurality of bus bars 32C joined via the insulation resin are integrally arranged along the plurality of linear conductors 21. In the bus bars 32C, the interval of the bus bars 32C, the space between the pair of the terminal through holes 34 passing the positive and negative electrode terminals 13A, 13B and the inner diameter of this through hole can be suitably changed according to the size or the like of the battery cell 12. Thus, as the bus bars thus changed depending on the size or the like of the battery cell can be formed easily, the battery wiring module 30C of a quite high versatility can be obtained.

Further, in the connection process, each of the bus bars 320 can be electrically connected to the predetermined linear conductor 21 by the simple work of forming the notch 41, 44*a* of the necessary length at the predetermined portion of the insulation resin part 23, then raising the cut and raised conductor 35, 44 thus separated by the notch and connecting the tip of the cut and raised conductor 35, 44 to the corresponding bus bar 32C.

Further, as the plurality of bus bars 320 are integrally arranged along the plurality of linear conductors 21 via the insulation resin, mounting workability at the time of assembling the battery wiring module 300 with the battery module 20 can be prevented from being degraded. Of course, it is not necessary to separately prepare a member for arranging the plurality of bus bars 320 on the battery module 20.

Thus, according to the battery wiring modules 30A, 30B, 300 and the battery wiring module manufacturing methods thereof according to the respective embodiments, wiring to the respective battery cells 12 can be performed easily with the simple configuration, and also versatility can be improved and a manufacturing cost can be reduced Herein the features of the battery wiring module and the battery wiring module manufacturing method according to the embodiments will be briefly summarized and listed below

[1] A battery wiring module (30A, 30B, 30C) to be combined with a battery module (20) including a plurality of battery cells (12) stacked in a state of being alternatively reversed so that a positive electrode terminal (13A) and a negative electrode terminal (13B) are adjoined between the adjacent battery cells, the battery wiring module comprising:

a plurality of linear conductors (21) which are arranged in parallel at an interval;

a plurality of bus bars (32A, 32B, 32C) which are arranged in parallel at a predetermined interval (P) along to at least one side of the plurality of linear conductors (21) so that each of the plurality of bus bars electrically connects the positive electrode terminal (13A) and the negative electrode terminal (13B) adjacent to each other; and an insulation resin part (23) which integrally covers both an outer periphery of the plurality of linear conductors (21) and side edges (32a) of the plurality of bus bars (32A, 32B, 32C) adjacent to the linear conductors (21), wherein each of the linear conductors (21) is electrically connected to a predetermined bus bar (32A, 32C) via a cut and raised conductor (35, 44) which is cut and raised by a notch (41, 44a) of a necessary length in a predetermined portion along a longitudinal direction of the insulation resin part (23).

[2] A manufacturing method for the battery wiring module (30A, 30B) to be combined with a battery module (20) including a plurality of battery cells (12) stacked in a state of being alternatively reversed so that a positive electrode terminal (13A) and a negative electrode terminal (13B) are adjoined between adjacent battery cells, the manufacturing method comprising:

arranging a long plate-shaped conductor (33) in parallel with a plurality of linear conductors (21) along to at least one side of the plurality of linear conductors, wherein the plurality of linear conductors (21) are arranged in parallel at an interval;

covering both an outer periphery of the plurality of linear conductors (21) and a side edge (33a) of the plate-shaped conductor (33) adjacent to the plurality of linear conductors (21) with an insulation resin part (23) integrally formed by extrusion molding;

punching a plurality of slits (45) at a predetermined interval (P) along a longitudinal direction of the plate-shaped conductor (33) in order to form a plurality of bus bars (32A, 32B) for electrically connecting the positive electrode terminal (13A) and the negative electrode terminal (13B) adjacent to each other; and electrically connecting each of the plurality of linear conductors (21) to the predetermined bus bar (32A) via a cut and raised conductor (35, 44) which is cut and raised by a notch (41, 44a) of a necessary length in a predetermined portion along a longitudinal direction of the insulation resin part (23).

[3] A manufacturing method for the battery wiring module (30C) to be combined with a battery module (20) including a plurality of battery cells (12) stacked in a state of being alternatively reversed so that a positive electrode terminal (13A) and a negative electrode terminal (13B) are adjoined between adjacent battery cells, the manufacturing method comprising:

arranging a plurality of bus-bars (32C) in parallel with a plurality of linear conductors (21) along to at least one side of the plurality of linear conductors, wherein the plurality of linear conductors (21) are arranged in parallel at a predetermined interval so that a positive electrode terminal (13A) and a negative electrode terminal (13B) are adjoined between the adjacent battery cells;

hot pressing a bus bar connection part (23a) of an insulation resin part (23) to side edges (32a) of the plurality of bus bars (32C) adjacent to the plurality of linear conductors (21), wherein the insulation resin part (23) includes a covering part (23b) covering an outer periphery of the plurality of linear conductors (21); and electrically connecting each of the plurality of linear conductors (21) to the predetermined bus bar (32C) via a cut and raised conductor (35, 44) which is cut and raised by a notch (41, 44a) of a necessary length in a predetermined portion along a longitudinal direction of the insulation resin part (23).

Incidentally, the invention is not limited to the aforesaid embodiments but suitable changes, improvements, and so on may be performed. The material, shapes, sizes, numbers, arrangement positions, etc. of the respective constituent elements in the aforesaid embodiments may be optional ones and not limited to particular ones so long as the invention is achieved.

DESCRIPTION OF THE REFERENCE NUMERALS AND SIGNS

13 battery cell
13A positive electrode terminal
13B negative electrode terminal
20 battery module
21 linear conductor
23 insulation resin part
30A, 30B, 30C battery wiring module
32A, 32B, 320 bus bar
32a side edge
35 cut and raised conductor
41 notch
43 end portion
44 cut and raised conductor
44a notch

What is claimed is:

1. A battery wiring module to be combined with a battery module including a plurality of battery cells stacked in a state of being alternatively reversed so that a positive electrode terminal and a negative electrode terminal are adjoined between the adjacent battery cells, the battery wiring module comprising:

a plurality of linear conductors which are arranged in parallel at an interval;

a plurality of bus bars which are arranged in parallel with the plurality of linear conductors and arranged at an interval along to at least one side of the plurality of linear conductors so that each of the plurality of bus bars electrically connects the positive electrode terminal and the negative electrode terminal adjacent to each other; and an insulation resin part which integrally covers both an outer periphery of the plurality of linear conductors and side edges of the plurality of bus bars adjacent to the linear conductors, wherein each of the linear conductors has a notch formed of a pair of parallel portions respectively cut in parallel to the linear conductor, and an orthogonal portion for coupling ends of the pair of parallel portions, and wherein each of the linear conductors is electrically connected to a predetermined one of the plurality of bus bars via a cut and raised conductor which is cut and raised by the notch of a predetermined length in a predetermined portion along a longitudinal direction of the insulation resin part.

2. The battery wiring module according to claim 1, wherein each of the linear conductors further comprises a remaining part on a downstream side from the orthogonal potion of each of the linear conductors, wherein each of the remaining parts becomes nonconductive.

3. A manufacturing method for a battery wiring module to be combined with a battery module including a plurality of battery cells stacked in a state of being alternatively reversed so that a positive electrode terminal and a negative electrode terminal are adjoined between adjacent battery cells, the manufacturing method comprising:

arranging a long plate-shaped conductor in parallel with a plurality of linear conductors along to at least one side of the plurality of linear conductors, wherein the plurality of linear conductors are arranged at an interval;

covering both an outer periphery of the plurality of linear conductors and a side edge of the plate-shaped conductor adjacent to the plurality of linear conductors with an insulation resin part integrally formed by extrusion molding;

punching a plurality of slits at a predetermined interval along a longitudinal direction of the plate-shaped conductor in order to form a plurality of bus bars for electrically connecting the positive electrode terminal and the negative electrode terminal adjacent to each other; and electrically connecting each of the plurality of linear conductors to a predetermined one of bus bars via a cut and raised conductor which is cut and raised by a notch of a predetermined length in a predetermined portion along a longitudinal direction of the insulation resin part, wherein the notch is formed of a pair of parallel portions cut respectively in parallel to the linear conductor, and an orthogonal portion for coupling ends of the pair of parallel portions.

4. The manufacturing method for a battery wiring module according to claim 3, wherein a remaining part is formed on a downstream side from the orthogonal potion of each of the linear conductors, wherein each of the remaining parts becomes nonconductive.

5. A manufacturing method for a battery wiring module to be combined with a battery module including a plurality of battery cells stacked in a state of being alternatively reversed so that a positive electrode terminal and a negative electrode terminal are adjoined between adjacent battery cells, the manufacturing method comprising:

arranging a plurality of bus-bars in parallel with a plurality of linear conductors along to at least one side of the plurality of linear conductors, wherein the plurality of linear conductors are arranged at an interval so that a positive electrode terminal and a negative electrode terminal are adjoined between the adjacent battery cells;

hot pressing a bus bar connection part of an insulation resin part to side edges of the plurality of bus bars adjacent to the plurality of linear conductors, wherein the insulation resin part includes a covering part covering an outer periphery of the plurality of linear conductors; and electrically connecting each of the plurality of linear conductors to a predetermined one of bus bars via a cut and raised conductor which is cut and raised by a notch of a predetermined length in a predetermined portion along a longitudinal direction of the insulation resin part, wherein the notch is formed of a pair of parallel portions cut respectively in parallel to the linear conductor, and an orthogonal portion for coupling ends of the pair of parallel portions.

6. The manufacturing method for a battery wiring module according to claim 5, wherein a remaining part is formed on a downstream side from the orthogonal potion of each of the linear conductors, wherein each of the remaining parts becomes nonconductive.

* * * * *